United States Patent
Stuttaford et al.

(10) Patent No.: US 6,536,201 B2
(45) Date of Patent: Mar. 25, 2003

(54) COMBUSTOR TURBINE SUCCESSIVE DUAL COOLING

(75) Inventors: Peter Stuttaford, Toronto (CA); Bernhard Fischer, Toronto (CA); David Edwin Cowburn, Oakville (CA); Saeid Oskooei, Toronto (CA); Michael Andrew Fryer, Oakville (CA); Aleksandar Kojovic, Oakville (CA); Jeffrey Scott Acton, Toronto (CA)

(73) Assignee: Pratt & Whitney Canada Corp., Quebec (CA)

( * ) Notice: Subject to any disclaimer, the term of this patent is extended or adjusted under 35 U.S.C. 154(b) by 16 days.

(21) Appl. No.: 09/733,051

(22) Filed: Dec. 11, 2000

(65) Prior Publication Data
US 2002/0069644 A1 Jun. 13, 2002

(51) Int. Cl.[7] .............................................. F02G 03/00
(52) U.S. Cl. ........................... 60/39.02; 60/755; 60/757
(58) Field of Search ............................. 60/39.02–39.36, 60/754, 755, 756, 757

(56) References Cited

U.S. PATENT DOCUMENTS

| | | | | |
|---|---|---|---|---|
| 2,326,072 A | * | 8/1943 | Seippel | 60/41 |
| 2,445,661 A | * | 7/1948 | Constant et al. | 60/41 |
| 2,510,645 A | * | 6/1950 | McMahan | 60/44 |
| 2,573,694 A | * | 11/1951 | De Zubay et al. | 60/39.65 |
| 2,588,728 A | * | 3/1952 | Hundstad | 60/39.65 |
| 2,640,319 A | * | 6/1953 | Wislicenus | 60/39.66 |
| 2,712,729 A | * | 7/1955 | Wigg | 60/39.66 |
| 2,743,579 A | * | 5/1956 | Gaubatz | 60/39.36 |
| 2,800,767 A | * | 7/1957 | Taylor | 60/39.36 |
| 2,977,760 A | * | 4/1961 | Soltau et al. | 60/39.65 |
| 3,088,279 A | * | 5/1963 | Diedrich | 60/39.65 |
| 3,088,281 A | * | 5/1963 | Soltau et al. | 60/39.65 |
| 3,383,855 A | * | 5/1968 | Freeman et al. | 60/39.65 |
| 3,388,888 A | * | 6/1968 | Kercher et al. | 253/39.1 |
| 3,433,015 A | * | 3/1969 | Sneeden | 60/39.36 |
| 3,440,818 A | * | 4/1969 | Quillevere et al. | 60/39.65 |
| 3,570,241 A | * | 3/1971 | Alexander | 60/39.65 |
| 3,589,127 A | * | 6/1971 | Kenworthy | 60/36.65 |
| 3,620,012 A | * | 11/1971 | Wilde | 60/39.36 |
| 3,777,484 A | * | 12/1973 | Dibelius et al. | 60/39.65 |
| 4,045,956 A | * | 9/1977 | Markowski et al. | 60/39.65 |
| 4,109,459 A | * | 8/1978 | Ekstedt et al. | 60/39.66 |
| 4,339,925 A | | 7/1982 | Eggmann et al. | |
| 4,567,730 A | * | 2/1986 | Scott | 60/757 |
| 4,719,748 A | | 1/1988 | Davis, Jr. et al. | |
| 4,821,522 A | * | 4/1989 | Matthews et al. | 60/757 |
| 4,864,827 A | | 9/1989 | Richardson et al. | |
| 4,872,312 A | | 10/1989 | Iizuka et al. | |
| 5,388,412 A | * | 2/1995 | Schulte-Werning et al. | 60/755 |
| 5,467,815 A | | 11/1995 | Haumann et al. | |
| 5,555,721 A | | 9/1996 | Bourneuf et al. | |
| 5,598,697 A | | 2/1997 | Ambrogi et al. | |
| 5,680,767 A | | 10/1997 | Lee et al. | |
| 5,687,572 A | | 11/1997 | Schrantz et al. | |
| 5,758,504 A | * | 6/1998 | Abreu et al. | 60/757 |
| 6,079,199 A | * | 6/2000 | McCaldon et al. | 60/757 |

FOREIGN PATENT DOCUMENTS

| | | |
|---|---|---|
| EP | 0624757 | 11/1994 |
| WO | WO 0109553 | 2/2001 |

\* cited by examiner

Primary Examiner—Charles G. Freay
Assistant Examiner—John Belena
(74) Attorney, Agent, or Firm—Bachman & LaPointe, P.C.

(57) ABSTRACT

The present invention is directed to a combustor/turbine successive dual cooling arrangement in which the combustor has a one-piece hot combustor wall and front and rear cold combustor walls, and cooling air is forced under pressure through perforations in the cold combustor walls and impinges on the annular front and rear sections of the hot combustor wall for the backside cooling of the hot combustor wall. The exhaust combustor backside cooling air is directed to gain access to the hot end of the engine, that is, the turbine section, to cool the turbine components. The combustor/turbine successive dual cooling arrangement according to the present invention enables all the air typically used to cool the hot end of the engine downstream of the combustor, to be used as combustor backside cooling as well, to significantly reduce the amount of air needed for combustor and turbine cooling. Moreover, all the exhaust combustor backside cooling air must be used for turbine cooling and is never ingested into the combustion chamber, thereby avoiding negatively affecting the engine combustion emissions.

16 Claims, 1 Drawing Sheet

COMBUSTOR TURBINE SUCCESSIVE DUAL COOLING

THE FIELD OF THE INVENTION

The present invention relates generally to a turbine cooling structure in a gas turbine engine and more specifically to an improved configuration of a combustor/turbine successive dual cooling arrangement.

BACKGROUND OF THE INVENTION

In a conventional gas turbine engine comprising a compressor, combustor and turbine, both the combustor and the turbine require cooling due to beating thereof by hot combustion gases.

Within the combustor, fuel fed through the fuel nozzle is mixed with compressed air provided by the high pressure compressor and ignited to drive turbines with the hot gases emitted through the combustor. Within the metal combustor, the gases burn at approximately 3,500° to 4,000° Fahrenheit. The combustion chamber is fabricated of a metal which can resist extremely high temperatures. However, even highly resistant metal will melt at approximately 2,100° to 2,200° Fahrenheit. Therefore, it is important to adequately cool the hot combustor wall of a gas turbine engine for safe engine operation.

As is well known in the art, the combustion gases are prevented from directly contacting the material of the combustor through use of a cool air film which is directed along the internal surfaces of the combustor. The combustor has a number of louver openings through which compressed air is fed parallel to the hot combustor walls. Eventually the cool air curtain degrades and is mixed with the combustion gases. However, in such air film cooling arrangements, the cooling air mixed with the combustion gases increases CO emissions. Thus, while cooling techniques used on the combustor liner may be advantageous in increasing maximum engine temperature, they deleteriously increase CO formation and emission.

The use of air film cooling is limited by the amount of air available exclusively for cooling the combustor wall. Generally, as the amount of cooling air is increased to cool the engine components, the amount of air available for the combustor is decreased, which results in increasing $NO_x$ formation and emission.

Efforts have been made to cool the combustor wall of a gas turbine engine while avoiding the increase of emissions. For example, U.S. Pat. No. 5,687,572, issued to Schrantz et al. on Nov. 18, 1997, discloses a combustor for a gas turbine engine having a porous outer metallic shell and a thin-walled, nonporous ceramic liner the backside of which is impingement cooled. All air flow used for impingement cooling is re-injected into the combustion process itself, preferably, primarily in the dilution zone of the combustion process so that there is no loss of pressurized air flow from a thermodynamic standpoint, which is advantageous to reduce $NO_x$ formation, and also no film cooling on the interior surface of the ceramic liner is introduced to induce CO formation.

In another example, U.S. Pat. No. 5,758,504 issued to Abreu et al. on Jun. 2, 1998 discloses a combustor construction including an interior liner having a plurality of angled holes extending therethrough, arranged in a pre-established pattern defining a centroid, and an exterior liner having a plurality of holes extending therethrough at about 90 degrees. At least a portion of the holes in the exterior liner are radially aligned with the centroid of the holes in the interior to reduce the use of cooling air flow per unit length of the combustor wall, thereby resulting in reduction of CO emissions.

In addition to the combustor cooling, in a turbine section of a gas turbine engine, both rotating turbine components such as blades, disks and retainers, and stationary turbine components such as vanes, shrouds and frames are directly exposed to high temperature combustion gases discharged from the combustor and routinely require cooling. Cooling of the turbine, especially the rotating components, is critical to the proper function and safe operation of the engine. Failure to adequately cool a turbine disk and its blades, for example, by providing cooling air deficient in supply pressure, volumetric flow rate or temperature margin, may be detrimental to the life and mechanical integrity of the turbine.

Balanced with the need to adequately cool the turbine is the desire for high levels of engine operating efficiency, which translate into lower fuel consumption and lower operating costs. Since turbine cooling air is typically drawn from one or more stages of the compressor and channeled by various means such as pipes, ducts and internal passageways to the desired components, such air is not available to be mixed with the fuel, ignited in the combustor and undergo work extraction in the primary gas flow path of the turbine, total cooling flow bled from the compressor is therefore treated as a parasitic loss in the engine operating cycle, it being desirable to keep such loses to a minimum.

Efforts have been made to minimize compressor bleed and concomitant cycle losses, for example, by attempting to control bleed source or cooling circuit parameters, such as source pressure, pressure drop, flow rate or temperature. One example is disclosed in U.S. Pat. No. 5,555,721 issued to Bourneuf et al. on Sep. 17, 1996. Burneuf et al. describe a turbine cooling supply circuit for a gas turbine engine in which the flow of coolant through the engine is directed to minimize temperature rise prior to discharge into the turbine. In addition to being used for combustion, compressor discharge pressurized air, which is disposed within a combustor casing, is utilized to cool components of the turbine section subject to the hottest combustion gases, namely the stage one nozzle, a stage one shroud and the stage one disk. Additional bleed sources for turbine cooling air include an impeller tip forward bleed flow and impeller tip aft bleed flow which are provided to additionally cool the stage two nozzle and stage two shroud respectively, as well as other turbine components. Bourneuf et al. do not address the cooling of the combustor wall and it would be understood from the drawings attached thereto that a film cooling arrangement is intended to be used.

It has been realized that directing air for cooling, rather than combustion control, limits the degree of combustion emission optimization, and the minimization of the amount of combustor cooling is critical to the design of a state of the art low emission gas turbine combustion system. Therefore, there have been continuous efforts in the industry to develop combustor/turbine cooling apparatus and methods for low emission gas turbine engines.

SUMMARY OF THE INVENTION

It is one object of the present invention to provide a low emission gas turbine combustion system using an improved cooling method.

It is another object of the present invention to provide a cooling system for a gas turbine engine to significantly reduce the coolant volume in combustor liner cooling.

It is a further object of the present invention to provide a combustor/turbine successive dual cooling to permit all the air typically used to cool the hot end of the engine downstream of the combustor to be used as combustor cooling as well.

In general terms, a method for cooling a gas turbine engine combustor and turbine section comprises, providing a structure; enabling pressurized cooling air to form air flow impingement on an outer surface of a combustor wall for backside cooling of the combustor wall; directing the air flow immediately upon the impingement thereof along the outer surface of the combustor wall, downstream towards a turbine section for further cooling the combustor wall; and providing an access to exhaust combustor backside cooling air flow for cooling the turbine section.

In accordance with one aspect of the present invention, a cooling apparatus for a gas turbine engine having a combustor comprises a wall adapted to be attached to a combustor wall of a gas turbine engine. The wall is in a spaced apart and substantially parallel relationship with respect to an outer surface of the combustor wall to form an air passage between the wall and the combustor wall for conducting cooling air to cool the outer surface of the combustor wall. Means are provided for introducing the cooling air from a pressurized cooling air source into the air passage to cause impingement thereof on the combustor wall for backside cooling. Means are also provided for discharging the cooling air from the air passage to cool a turbine section downstream of the combustor of the gas turbine engine. The means for introducing cooling air preferably includes perforations in the wall in fluid communication with the air passage and a plenum within a combustor casing so that the cooling air introduced from the plenum through the perforations impinges the outer surface of the combustor wall before being directed downstream through the air passage. The means for discharging the cooling air preferably includes an open downstream end of the air passage to provide an access to exhaust combustor backside cooling air, for hot end cooling so that all, and only the exhaust combustor backside cooling air cools the turbine section.

A gas turbine engine combustor according to a preferred embodiment of the present invention includes a one-piece hot combustor wall defining a combustion chamber. The hot combustor wall includes an inner surface in communication with hot combustion gases flowing towards a turbine section, and an outer surface in contact with cooling air. The gas turbine engine combustor further includes a cold combustor wall fixed to the hot combustor wall. The cold combustor wall is substantially parallel to and disposed at a distance from the hot combustor wall, to form an air passage between the hot and cold walls for directing the cooling air towards the turbine section. A plurality of holes extend through the cold combustor wall in fluid communication with the air passage and a primary plenum within a combustor casing, so that pressurized cooling air in the primary plenum enters the holes to cause an impingement on the outer surface of the hot combustor wall for backside cooling thereof before being directed through the air passage towards the turbine section. The air passage has a closed upstream end and an open downstream end thereof to provide an access to exhaust combustor backside cooling air for cooling the turbine section, whereby all, and only the exhaust combustor backside cooling air is directed to cool turbine components.

It is preferable that a front cold combustor wall is fixed to a front section of the hot combustor wall and a rear cold combustor wall is fixed to a rear section of the hot combustor wall. The front cold combustor wall is fixed at an upstream end thereof by an a spacer, to the front section of the hot combustor wall to form the closed upstream end of the air passage. A downstream end of the front cold combustor wall is supported on a casing structure and the open downstream end of the air passage is adapted to discharge the exhaust combustor backside cooling air into a turbine cavity for cooling turbine components. The rear cold combustor wall is fixed at an upstream end thereof by a spacer, to the rear section of the hot combustor wall, to form the closed upstream end of the air passage. The open downstream end of the air passage formed between the rear cold combustor wall and the rear section of the hot combustor wall is in fluid communication with a secondary plenum providing access to the exhaust combustor backside cooling air for cooling the turbine section.

The combustor/turbine successive dual cooling method and structure according to the present invention advantageously permit compressor air to impingement-backside cool the combustor wall before being diverted to downstream for hot end cooling, and the cooling air is never ingested into the combustion system but is only used to cool the combustor wall and the turbine section so that the amount of combustor backside cooling is significantly reduced, thereby resulting in low emissions of the gas turbine engine.

BRIEF DESCRIPTION OF The DRAWINGS

Having thus generally described the nature of the present invention, reference will now be made to the accompanying drawings, showing by way of illustration a preferred embodiment thereof, and in which.

DETAILED DESCRIPTION OF THE PREFERRED EMBODIMENTS

Figure 1:
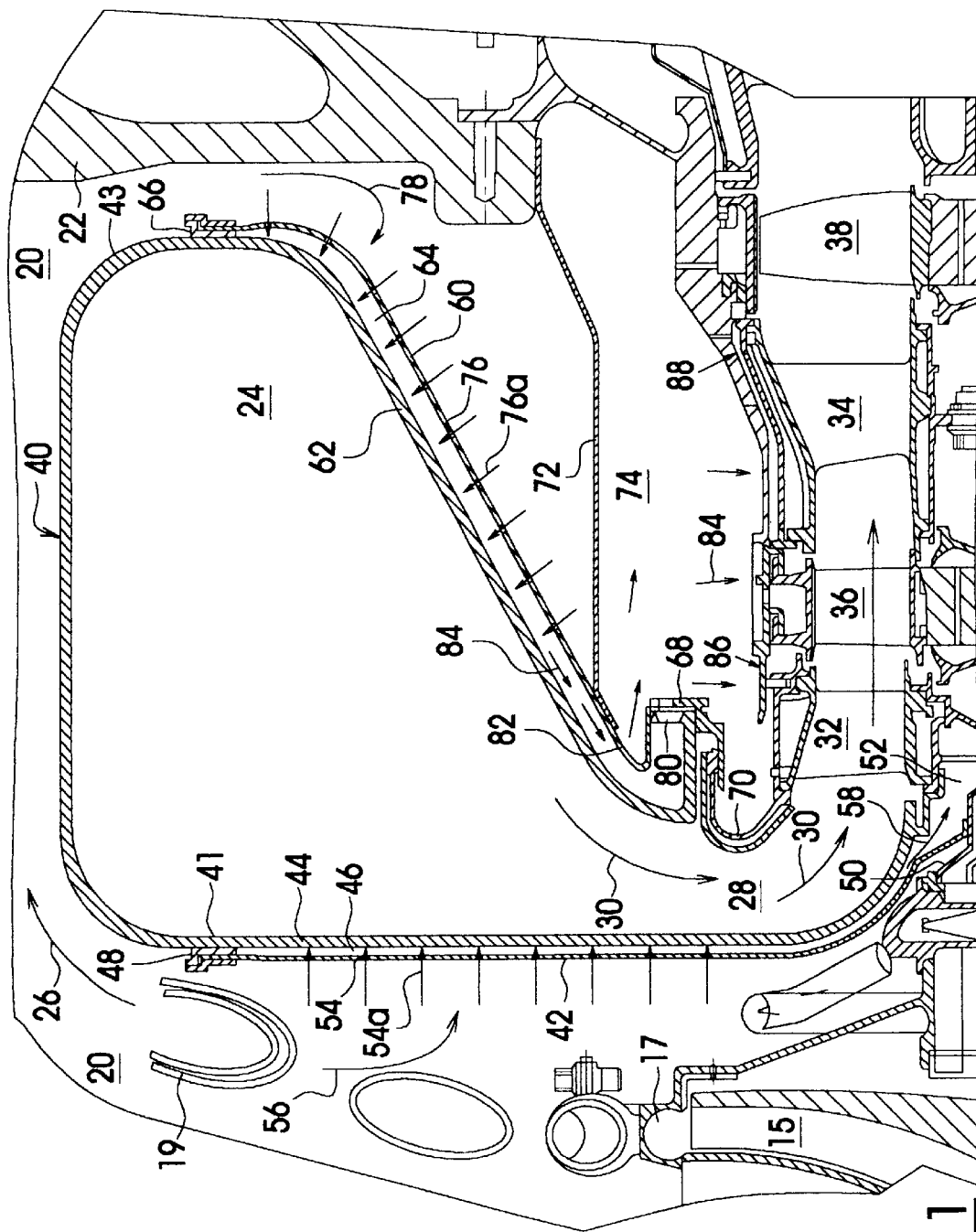
FIG. 1 illustrates a partial cross-sectional, axial view of the combustion and turbine sections of a gas turbine engine incorporating a preferred embodiment of the present invention.

The present invention relates to the principles of a successive dual cooling scheme permitting compressed air to impingement and backside cool the combustor wall before being diverted to downstream hot end cooling so as to minimize the amount of the combustor and turbine cooling airflow and thus reduce combustion emissions. The principles set forth in the present invention are described with respect to one particular application of an exemplary low emission gas turbine engines having an annular combustor, but may be applied to other gas turbine engine combustors and are not restricted to the application of annular combustors FIG. 1 illustrates the centrifugal impeller stage 15 of a compressor section of the gas turbine engine which directs flow radially outwardly to a diffuser 17. The air flow is then directed axially by diffuser pipes 19, which function to slow the air flow velocity and increase the pressure of the air flow in a manner well known in the art. High pressure air flow is thus directed into the primary annular plenum 20 which is defined within a combustor casing 22 and surrounds the annular combustion chamber 24.

As illustrated in FIG. 1, the air flow within the annular plenum 20 is directed around the combustion chamber 24, generally in the direction of the arrow 26. The combustion chamber 24 uses a major portion of this air flow in the combustion process by means of mixing the air flow with injected fuel (not shown). The high temperature, high pressure exhaust gases which are produced during the combustion process are then directed into the exit duct 28. The exhaust gases follow the flow path illustrated by the arrows 30, and flow across the stage one stator vanes 32 into the turbine section which further includes the stage two stator vanes 34, and the stage one and stage two turbine disk mounting blades 36 and 38. A portion of the air flow passing through the annular plenum 20 is also used for cooling the combustor and the turbine section by means of air channeling which is described below.

The combustion chamber 24 is defined by a one-piece hot combustor wall 40 which includes an inner surface 41 in communication with hot combustion gases flowing towards the turbine section and the outer surface 43 in contact with the cooling air in the plenum 20. A front cold combustor wall 42 is affixed to an annular front section 44 of the hot combustor wall 40, and is substantially parallel to, and disposed at a distance from the hot combustor wall 40 to form an air passage 46 between the front cold combustor wall 42 and the front section 44 of the hot combustor wall 40. The annular front cold combustor wall 42 is secured at its upstream end, to the front section 44 of the hot combustor wall 40 by a spacer 48 to form a closed upstream end of the air passage 46. The annular front cold combustor wall 42 is supported at its annular downstream end on a casing structure 50 to form an open downstream end of the air passage 46 which is in fluid communication with a turbine cavity 52.

A plurality of holes 54 extend through the annular front cold combustor wall 42 in fluid communication with the air passage 46 and the primary plenum 20. A portion of the air flow, generally indicated by the arrow 56, passing through the plenum 20 is forced under pressure into the air passage 46 through the holes 54 in the annular front cold combustor wall 42. The air flow 56 passing through the holes 54 in the annular front cold combustor wall 42 impinges on the outer surface 43 of the hot combustor wall 40 at the annular front section thereof, as illustrated by arrows 54a, which results in the backside cooling of the front section of the hot combustor wall 40. Immediately upon the impingement the combustor backside cooling air is directed, indicated by the arrow 58, downstream toward the turbine section and is discharged from the open downstream end of the air passage 46 into the turbine cavity 52 to cool the turbine components, especially the stage one stator vanes 32 and the stage one disk mounting blades 36, through air passages (not shown), in a manner well known in the art.

An annular rear cold combustor wall 60 is affixed to the hot combustor wall 40 at its annular rear section 62 and is substantially parallel to and disposed at a distance from the hot combustor wall 40 to form an air passage 64 between the hot combustor wall 40 and the annular rear cold combustor wall 60. The annular rear cold combustor wall 60 is secured at its annular upstream end to the hot combustor wall 40 by an annular spacer 66 to form a closed upstream end of the air passage 64. The annular downstream end of the rear cold combustor wall 60 is supported by an annular support structure 68 which is connected to a rear part of the annular combustion exit duct 28. An annular separate wall 72 connected at its front end to a downstream section of the annular rear cold combustor wall 60, extends axially and rearwardly to connect with the combustor casing structure 22 to form a secondary plenum 74, which is separated from the primary plenum 20 and surrounds the turbine section.

A plurality of holes 76 extend through the annular rear cold combustor wall 60 and are in fluid communication with the air passage 64 and the primary plenum 20. A portion of the air flow, generally indicated by the arrow 78, passing through the primary plenum 20 is forced under pressure through the holes 76 in the annular rear cold combustor wall 60, into the air passage 64, and impinges on the outer surface 43 of the hot combustor wall 40 at the annular rear section 62, as illustrated by arrows 76a, for the backside cooling of the annular rear section 62 of the hot combustor wall 40.

Orifices are provided in the annular support structure 68 and/or in the annular rear cold combustor wall 60 downstream of the point connecting the annular separate wall 72, as indicated by numerals 80 and 82 respectively. The orifices 80 and 82, preferably controllable, are in fluid communication with the air passage 64 and the secondary plenum 74 so that the exhaust combustor backside cooling air, indicated by the arrows 84, in the air passage 64 is directed downstream towards the open downstream end of the air passage 64 formed by the orifices 80 and 82, and is further discharged into the secondary plenum 74. The exhaust combustor backside cooling air 84 in the secondary plenum 74 has access to the hot end of the engine which particularly refers to the stage one stator vanes 32, the stage one disk mounting blades 36 and the shroud assembly 86 that surrounds stage one of the turbine section. The exhaust combustor backside cooling air 84 also has access to the stage two stator vanes 34, the stage two disk mounting blades 38 and the shroud assembly 88 that surrounds stage two of the turbine section. Through both accesses to stage one and stage two of the turbine section, which are well known in the art and are not further described with details, the exhaust combustor backside cooling air 84 in the secondary plenum 74 is forced under pressure to flow through and contact those turbine components for the turbine section cooling.

In such an arrangement all cooling air flow is forced through a cooling circuit in which the hot combustor wall 40 of the combustion chamber 24 is backside cooled by air flow impingement thereon and the exhaust backside cooling air is then directed for the hot end cooling. There is no cooling air directed to cool the turbine section without first being used for backside cooling of the combustor wall. Moreover, all exhaust backside cooling air must be used for cooling the turbine section and exhaust backside cooling air never enters the combustion chamber 24 to affect combustion emissions.

Modifications and improvements to the above-described embodiment of the (present?) invention may become apparent to those skilled in the art. The foregoing description is intended to be exemplary rather than limiting. The scope of the invention is therefore intended to be limited solely by the scope of the appended claims.

We claim:

1. A cooling apparatus for a gas turbine engine having a combustor comprising:

a wall adapted to be attached to a combustor wall of the gas turbine engine, in a space apart and substantially parallel relationship with respect to an outer surface of the combustor wall to form an air passage between the wall and the combustor wall for conducting cooling air to cool the outer surface of the combustor wall; means for introducing the cooling air from a pressurized cooling air source into the air passage to cause an impingement thereof on the combustor wall for backside cooling; and means for discharging all the cooling air from the air passage to cool a turbine section downstream of the combustor of the gas turbine engine.

2. A cooling apparatus as claimed in claim 1 wherein the means for introducing cooling air comprises perforations in the wall in fluid communication with the air passage and a plenum within a combustor casing so that the cooling air introduced from the plenum through the perforations impinges the outer surface of the combustor wall before being directed downstream through the air passage.

3. A cooling apparatus as claimed in claim 2 wherein the means for discharging the cooling air comprises an open downstream end of the air passage to provide an access to exhaust combustor backside cooling air for hot end cooling so that all, and only the exhaust combustor backside cooling air cools the turbine section.

4. A cooling apparatus as claimed in claim 2 wherein an upstream end of the air passage is closed.

5. A gas turbine engine combustor comprising:
   a one-piece hot combustor wall defining a combustion chamber, the hot combustor wall including an inner surface in communication with hot combustion gases flowing towards a turbine section, and an outer surface in contact with cooling air;
   a cold combustor wall fixed to the hot combustor wall, the cold combustor wall being substantially parallel to and disposed at a distance from the hot combustor wall to form an air passage between the hot and cold walls for directing the cooling air towards the turbine section;
   a plurality of holes extending through the cold combustor wall in fluid communication with the air passage and a primary plenum within a combustor casing so that pressurized cooling air in the primary plenum enters the holes to cause an impingement on the outer surface of the hot combustor wall for backside cooling thereof before being directed through the air passage towards the turbine section; and
   a closed upstream end of the air passage and an open downstream end of the air passage to provide an access to exhaust combustor backside cooling air for cooling the turbine section, whereby all, and only the exhaust combustor backside cooling air is directed to cool turbine components.

6. A gas turbine engine combustor as claimed in claim 5 wherein the cold combustor wall comprises a front cold combustor wall affixed to a front section of the hot combustor wall.

7. A gas turbine engine combustor as claimed in claim 6 wherein the front cold combustor wall is affixed at a upstream end thereof by a spacer to the front section of the hot combustor wall to form the closed upstream end of the air passage.

8. A gas turbine engine combustor as claimed in claim 6 wherein the front cold combustor wall is supported at a downstream end thereof on a casing structure and the open downstream end of the air passage is adapted to discharge the exhaust combustor backside cooling air into a turbine cavity.

9. A gas turbine engine combustor as claimed in claim 5 wherein the cold combustor wall comprises a rear cold combustor wall affixed to a rear section of the hot combustor wall.

10. A gas turbine engine combustor as claimed in claim 9 wherein the rear cold combustor wall is affixed at an upstream end thereof by a spacer to the rear section of the hot combustor wall to form the closed upstream end of the air passage.

11. A gas turbine engine combustor as claimed in claim 9 wherein the open downstream end of the air passage is in fluid communication with a secondary plenum surrounding the turbine section and providing access to and inside of the turbine section for cooling the turbine section.

12. A method for cooling a gas turbine engine combustor and turbine section comprising providing a structure:
    enabling pressurized cooling air to form air flow impingement on an outer surface of a combustor wall for backside cooling of the combustor wall;
    directing all the air flow immediately upon the impingement thereof along the outer surface of the combustor wall, downstream towards a turbine section; and
    providing an access to exhaust all combustor backside cooling air flow for cooling the turbine section.

13. A method as claimed in claim 12 wherein the air flow impingement on the outer surface of the combustor wall is formed by the pressurized cooling air flowing through perforations in a perforated wall disposed at a distance from the outer surface of the combustor wall.

14. A method as claimed in claim 13 wherein immediately upon the air flow impingement the air flow is directed downstream through an air passage formed between the combustor wall and the perforated wall.

15. A method as claimed in claim 14 wherein the exhaust combustor backside cooling air flow is introduced into a cavity of the turbine section to cool turbine components.

16. A method as claimed in claim 14 wherein the exhaust combustor backside cooling air flow is introduced into a plenum surrounding the turbine section and having access to an inside of the turbine section for cooling turbine components.

* * * * *